Patented July 14, 1942

2,289,376

UNITED STATES PATENT OFFICE 2,289,376

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application April 16, 1941, Serial No. 388,822

12 Claims. (Cl. 260—205)

This invention relates to new arylazo dye compounds and their application for the coloration of textile materials in the form of threads, yarns, fibers and fabrics. Coloration can be effected by dyeing, printing, stencilling or like methods.

We have discovered that the azo compounds having the general formula:

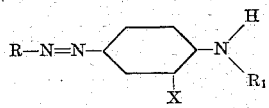

wherein R represents the residue of a member selected from the group consisting of a benzene and an azobenzene nucleus, $R_1$ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

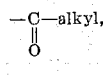

a

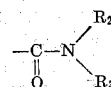

a —COOalkyl, a —SO$_2$alkyl and a

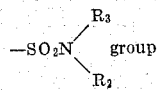

group wherein $R_2$ and $R_3$ each represents a member selected from the group consisting of hydrogen and an alkyl group, constitute a valuable class of dye compounds.

Compounds of our invention containing no nuclear sulfonic acid group, in either its free acid or salt form, have been found to be especially of value for the coloration of organic derivatives of cellulose and it is to these compounds and their application for the coloration of organic derivatives of cellulose that our invention is particularly directed. These nuclear non-sulfonated compounds likewise possess some application for the dyeing of wool, "Nylon," "Vinyon" and silk, but they are primarily adapted for the coloration of cellulose esters, especially cellulose acetate silk. For the coloration of organic derivatives of cellulose nuclear non-sulfonated compounds wherein R is a benzene residue and $R_1$ is alkyl are generally advantageous.

Compounds of our invention wherein the benzene or azobenzene nucleus contains a nuclear sulfonic acid group have little or no utility for the coloration of organic derivatives of cellulose but possess application for the coloration of wool and silk. Preferably when the dye compounds of our invention are to be employed for the coloration of organic derivatives of cellulose they should contain no nuclear free carboxylic acid group.

It is an object of our invention to provide a new class of azo dye compounds suitable for the coloration of organic derivatives of cellulose, wool, "Nylon," "Vinyon" and silk. Another object of our invention is to provide a process for the coloration of organic derivatives of cellulose, wool, "Nylon," "Vinyon" and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention can be prepared by diazotizing diazotizable members selected from the group consisting of an arylamine of the benzene series and an aminoazobenzene and coupling the diazonium compounds obtained with the coupling compounds having the general formula:

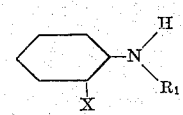

wherein $R_1$ and X have the meaning previously assigned to them. Compounds wherein R is a benzene nucleus and X is a

or a —SO₂ alkyl group appear to be the most advantageous.

It is to be understood that the benzene and azobenzene nuclei represented by R can be substituted with substituents such as a halogen atom, an alkyl, a cyano, an alkoxy, a nitro, a hydroxy, an alkylamino, a sulfonic and carboxyl group. Similarly, when R₁ is a benzene nucleus, it can be substituted with the substituents just named.

The term "alkyl," as used herein, includes unsubstituted alkyl groups such as a methyl group, an ethyl group, a propyl group or a butyl group as well as substituted alkyl groups such as β-hydroxyethyl, β-hydroxypropyl, β,γ-dihydroxypropyl, γ-hydroxypropyl, β-methoxyethyl, β-ethoxyethyl, β-sulfoethyl, γ-sulfopropyl, β-sulfatoethyl, β-phosphatoethyl, γ-phosphatopropyl and the alkyl esters of the hydroxyalkyl groups named, for example. Illustrative cycloalkyl groups include cyclobutyl, cyclohexyl and cycloheptyl. Similarly, illustrative of furyl may be mentioned a furyl radical such as furfuryl, tetrahydrofurfuryl, 5-ethylfurfuryl, 5-ethyltetrahydrofurfuryl and 5-β-hydroxyethyltetrahydrofurfuryl. By an unsaturated short chain aliphatic hydrocarbon group, whose unsaturation consists of a double bond, we include such groups as allyl and crotonyl, for example.

The azo dye compounds of our invention dye cellulose acetate silk, for example, desirable shades of good fastness to light and washing. Similarly, the azo dye compounds of our invention possess excellent affinity for cellulose acetate silk dyeing this material rapidly at temperatures as low as 60-65° C. This latter advantage is of real importance, for example, in jig dyeing operations and results in lowered dyeing costs since less heat is required in the dyeing operation.

The following examples illustrate the preparation of the azo dye compounds of our invention:

EXAMPLE 1

13.3 grams of p-nitroaline are added to 200 cc. of water to which has been added 36 grams of 36% hydrochloric acid. The resulting solution is then cooled to a temperature approximating 0-5° C. and the p-nitroaniline diazotized by the addition of 6.9 parts of sodium nitrite.

18 grams of 2-mono-β-hydroxyethylamino-acetophenone are dissolved in a cold dilute hydrochloric acid solution and the diazotized p-nitroaniline solution is slowly added with stirring while maintaining the reaction mixture at a temperature of about 0-10° C. After addition of the diazonium solution, the mixture is permitted to stand for several hours after which it is slowly made neutral to Congo red paper by the addition of sodium acetate. Upon completion of the coupling reaction which takes place, the dye compound formed is recovered by filtration, washed with water and dried. The dye compound obtained colors cellulose acetate silk orange.

EXAMPLE 2

13.8 grams of p-nitroaniline are diazotized and the diazonium compound obtained is coupled with 34 grams of 1-n-butylsulfone-2-mono-sodium-β-sulfoethylamino-benzene. Coupling and recovery of the dye compound formed can be carried out in accordance with the general procedure described in Example 1. The dye compound obtained colors cellulose acetate silk orange.

EXAMPLE 3

17 grams of 1-amino-2-chloro-4-nitrobenzene are diazotized and the diazonium compound obtained is coupled with 19.6 grams of 2-monoethylaminobenzene sulfonamide. Coupling and recovery of the dye compound formed can be carried out in accordance with the general procedure described in Example 1. The dye compound obtained colors cellulose acetate silk orange.

EXAMPLE 4

17 grams of 1-amino-2-chloro-4-nitrobenzene are diazotized and the diazonium compound obtained is coupled with 22.5 grams of 1-carboxymethyl-2-mono-β,γ-dihydroxypropylaminobenzene. Coupling and recovery of the dye compound formed can be carried out in accordance with the general procedure described in Example 1. The dye compound obtained colors cellulose acetate silk orange.

15.3 grams of 1-amino-2-hydroxy-4-nitrobenzene can be substituted for the 1-amino-2-chloro-4-nitrobenzene of the example to obtain a dye compound which colors cellulose acetate silk orange.

EXAMPLE 5

0.1 gram mole of 1-amino-2,4-dinitrobenzene is diazotized and the diazonium compound obtained is coupled with 0.1 gram mole of 1-ethylsulfone-2-mono-β-hydroxyethylamino-benzene. Coupling and recovery of the dye compound formed can be carried out in accordance with the general procedure described in Example 1. The dye compound obtained colors cellulose acetate silk rubine.

EXAMPLE 6

0.1 gram mole of p-nitroaniline is diazotized and the diazonium compound obtained is coupled with 0.1 gram mole of 2-mono-β-hydroxypropylaminobenzene carboxamide. Coupling and recovery of the dye compound formed can be carried out in accordance with the general procedure described in Example 1. The dye compound obtained colors cellulose acetate silk orange.

EXAMPLE 7

0.1 gram mole of p-aminoazobenzene is diazotized and the diazonium compound obtained is coupled with 1-n-propylketo-2-mono-γ-hydroxypropylamino-benzene. The coupling and recovery of the dye compound formed can be carried out in accordance with the general procedure described in Example 1. The dye compound obtained colors cellulose acetate silk orange.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried

| Amine | Coupling component | Color |
|---|---|---|
| 1-amino-2,4-dinitro-6-(Cl,Br,I)-benzene | (1) 1-ethylsulfone-2-monotetrahydrofurfurylamino-benzene. | Rubine. |
| Do | (2) 1-methylsulfonamide-2-monoallylamino-benzene. | Do. |
| Do | (3) 1-diethylsulfonamide-2-cyclohexylamino-benzene. | Do. |
| Do | (4) 1-ethylcarboxamide-2-mono-n-butylamino-benzene. | Do. |
| Do | (5) 1-carboxyethyl-2-monophenylamino-benzene. | Do. |
| Do | (6) 2-monoethylaminoacetophenone. | Do. |
| Do | (7) 1-n-propylsulfone-2-mono-β-ethoxyethylamino-benzene. | Do. |
| Do | (8) 1-ethylsulfone-2-N(H)(CH₂CH₂C(=O)—O—CH₃)-benzene. 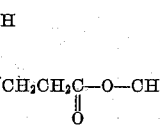 | Do. |
| Do | (9) 2-monophosphatoethylaminoacetophenone. | Do. |
| Do | (10) 2-mono-crotonylaminoacetophenone. | Do. |
| Do | (11) 2-mono-5-ethyltetrahydrofurfurylaminoacetophenone. | Do. |
| p-Nitroaniline | Coupling components 1-11 | Orange. |
| o-Chloroaniline | do | Yellow. |
| 1-amino-2-chloro-4-nitrobenzene | do | Orange. |
| 1-amino-2-cyano-4-nitrobenzene | do | Do. |
| 1-amino-2,4-dinitro-6-ethylsulfonamide-benzene. | do | Rubine. |
| 1-amino-2-methyl-4-nitroaniline | do | Orange. |
| 1-amino-2-methoxy-4-nitroaniline | do | Do. |
| 1-amino-2-methylketo-4-nitrobenzene | do | Do. |
| p-Aminoazobenzene | do | Do. |
| 4-nitrobenzeneazo-4'-aminobenzene | do | Do. |
| 2-chlorobenzeneazo-4'-aminobenzene | do | Orange. |
| p-Aminobenzoic acid | do | Yellow. |

Sulfonated amines that can be diazotized and employed in the preparation of the azo dye compounds of our invention include 1-amino-4-sulfonicbenzene, 1-amino-2,4-di-nitro-6-sulfonicbenzene, 1-amino-2-nitro-4,6-disulfonicbenzene, 1-amino-2-sulfonic-4-nitrobenzene, 4'-nitro-2'-sulfonicbenzeneazo-4-aminobenzene, 4'-nitrobenzeneazo-2-sulfonic-4-aminobenzene and benzeneazo-3-sulfonic-4-aminobenzene. The dye compounds obtained using the diazonium compounds of the amines above named can be employed for the dyeing of wool and silk. Any of the amines disclosed herein may be diazotized and the diazonium compounds obtained coupled with any of the coupling components disclosed herein to yield dye compounds of our invention.

For purposes of clarity, it is here noted that alkylcarboxamide and alkyl sulfonamide groups refer to groups wherein the alkyl radical is attached to the nitrogen atom. To illustrate, ethylsulfonamide is

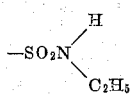

while ethylcarboxamide,

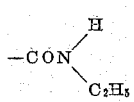

In order that the preparation of the azo dye compounds of our invention may be entirely clear, the preparation of representative coupling compounds used in their manufacture is described hereinafter.

*Preparation of 2-tetrahydrofurfurylaminophenylethylsulfone*

1 gram mole of ortho-chlorophenylethylsulfone is charged into an autoclave with one gram mole of tetrahydrofurfurylamine and the reaction mixture is heated at 200°–225° C. for fifteen hours. The reaction mixture is then cooled, removed from the autoclave, and the 2-tetrahydrofurfuryl- aminophenylethylsulfone formed is purified by distillation under reduced pressure.

Ortho-chlorophenylethylsulfone may be prepared as described in Journal American Chemical Society, vol. 56, page 1382.

*Preparation of 2-allylaminobenzenemethylsulfonamide*

1 gram mole of ortho-aminobenzenemethylsulfonamide is placed in a flask fitted with a stirrer, thermometer and reflux condenser together with 1.25 gram moles of sodium bicarbonate. 1.1 gram moles of allyl bromide are then added dropwise at 50° C., with stirring. Upon addition of the allyl bromide, the reaction is brought to completion by heating. The 2-allylaminobenzenemethylsulfonamide formed in the reaction is worked up in known fashion and may be purified by crystallization from ethyl alcohol.

Ortho-aminobenzenemethylsulfonamide can be prepared by reducing ortho-nitrobenzenemethylsulfonamide at 80° C. in methanol with hydrogen over a nickel catalyst. This latter compound can in turn be prepared by reacting o-nitrobenzenesulfonyl chloride with methylamine (excess) in acetone.

*Preparation of 2-cyclohexylaminobenzenediethylsulfonamide*

1 gram mole of o-aminobenzenediethylsulfonamide is placed in a flask fitted with a stirrer, thermometer and reflux condenser together with 1.25 gram moles of sodium bicarbonate. 1.1 gram moles of cyclohexyl bromide are then added dropwise with stirring while maintaining the reaction temperature at 50° C. The reaction is completed by heating. The 2-cyclohexylaminobenzenediethylsulfonamide formed is worked up in known fashion and can be purified by crystallization from alcohol.

o-aminobenzenediethylsulfonamide can be obtained by reducing o-nitrobenzenediethylsulfonamide which latter compound is prepared by reacting o-nitrobenzenesulfonyl chloride with diethylamine.

Preparation of 2-butylaminoethylbenzamide 1 gram mole of 2-aminoethylbenzamide is reacted with 1.1 gram moles of butyl bromide in accordance with the procedure described in the preceding example to obtain a good yield of 2-butylaminoethylbenzamide.

2-aminoethylbenzamide can be prepared by reducing o-nitroethylbenzamide which latter compound can, in turn, be prepared by reacting o-nitrobenzoyl chloride with ethylamine.

Preparation of 1-carboxyethyl-2-monophenyl-amino-benzene 1 gram mole of N-phenylanthranilic acid is dissolved in ethanol and the reaction mixture is saturated with dry hydrogen chloride. After 24 hours, the reaction mixture is poured into water, and the precipitate formed, consisting of the desired product, is recovered by filtration, washed with water and dried.

Preparation of 2-ethylaminophenylmethylketone 1 gram mole of o-aminophenylmethylketone is reacted with 1.1 gram moles of ethyl iodide. This reaction may be carried out similarly as the reaction of allyl bromide and o-aminobenzenemethylsulfonamide which has been previously described. The 2-ethylaminophenylmethylketone formed in the reaction may be recovered by distillation under reduced pressure.

It is here noted that the term "Nylon" refers to a linear polyamide resin which is believed to be basically described or claimed in U. S. Letters Patent 2,071,250, issued February 16, 1937, to Wallace H. Carothers. The term "Vinyon" refers to a vinyl chloride-vinyl acetate copolymer. This material is more completely identified at pages 73 and 74 of "Synthetic Organic Chemicals," 10th edition, published October 15, 1940, by Carbide & Carbon Chemicals Corporation.

The azo dye compounds of our invention are, for the most part, relatively insoluble in water. Those compounds which are insoluble in water may be advantageously employed for the direct dyeing of textile materials made from the materials named hereinbefore by grinding the dye to a fine powder, intimately mixing it with a suitable dispersing or solubilizing agent and adding the resulting mixture to water or a dilute solution of soap in water to form an aqueous dyebath. Following this known preparation of the dyebath, the material to be dyed may be added to the dye bath and the dyeing operation conducted as known to those skilled in the art. The dye compounds of our invention which are water-soluble ordinarily do not require the use of a dispersing or solubilizing agent but may be applied to the textile material to be dyed from an aqueous solution of the dye which may contain salt. These water-soluble dyes, of course, can be applied to the fiber in the presence of a dispersing or solubilizing agent. The manner in which the insoluble azo dye compounds of our invention may be employed for dyeing or coloration operations will be made more clear by reference to our U. S. Letters Patent No. 2,115,030, issued April 26, 1938. Similarly, the manner in which the water-soluble azo dyes may be employed for the coloration of textile materials will be more clear by reference to our U. S. Patent No. 2,107,898, issued February 8, 1938.

We claim:
1. The azo dye compounds having the general formula:

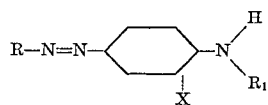

wherein R represents the residue of a member selected from the group consisting of a benzene and an azobenzene nucleus, $R_1$ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

a

a —COOalkyl, a —SO₂alkyl and a

wherein $R_2$ and $R_3$ each represents a member selected from the group consisting of hydrogen and an alkyl group.

2. The azo dye compounds having the general formula:

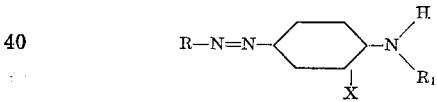

wherein R represents the residue of a benzene nucleus, $R_1$ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

a

a —COOalkyl, a —SO₂alkyl and a

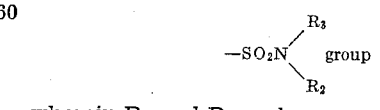

wherein $R_2$ and $R_3$ each represents a member selected from the group consisting of hydrogen and an alkyl group.

3. The azo dye compounds having the general formula:

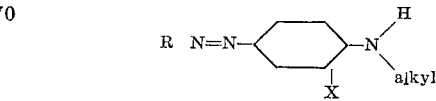

wherein R represents the residue of a benzene nucleus and X represents a member selected from the group consisting of a

a

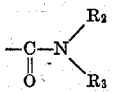

a —COOalkyl, a —SO₂alkyl and a

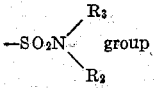

wherein R₂ and R₃ each represents a member selected from the group consisting of hydrogen and an alkyl group.

4. The azo dye compounds having the general formula:

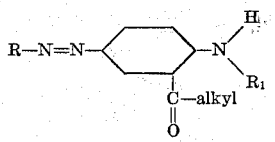

wherein R represents the residue of a benzene nucleus and R₁ represents a member selected from the group consisting of an alkyl group, a cycloalkyl group, a benzene nucleus, a furyl group and an unsaturated short chain aliphatic hydrocarbon group whose unsaturation consists of a double bond.

5. The azo dye compounds having the general formula:

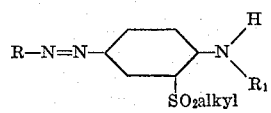

wherein R represents the residue of a benzene nucleus and R₁ represents a member selected from the group consisting of an alkyl group, a cycloalkyl group, a benzene nucleus, a furyl group and an unsaturated short chain aliphatic hydrocarbon group whose unsaturation consists of a double bond.

6. The azo dye compounds having the general formula:

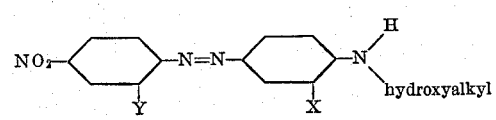

wherein Y represents a member selected from the group consisting of hydrogen, a halogen atom, a nitro group and an alkylsulfone group and X represents a member selected from the group consisting of a

a

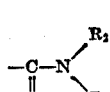

a —COOalkyl, a —SO₂alkyl and a

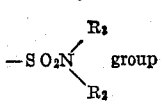

wherein R₂ and R₃ each represents a member selected from the group consisting of hydrogen and an alkyl group.

7. The azo dye compound having the formula:

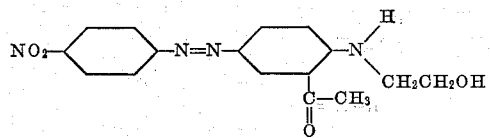

8. The azo dye compound having the formula:

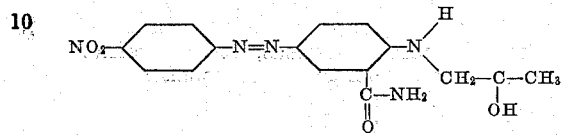

9. Textile material colored with an azo dye compound having the general formula:

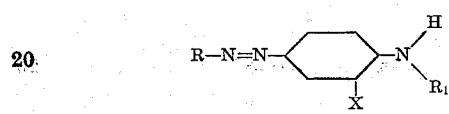

wherein R represents the residue of a member selected from the group consisting of a benzene and an azobenzene nucleus, R₁ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

a

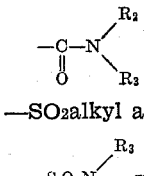

a —COOalkyl, a —SO₂alkyl and a

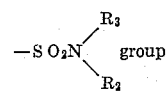

wherein R₂ and R₃ each represents a member selected from the group consisting of hydrogen and an alkyl group.

10. Textile material colored with an azo dye compound having the general formula:

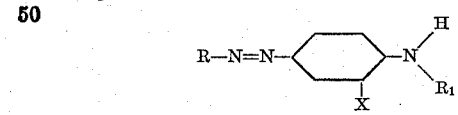

wherein R represents the residue of a benzene nucleus, R₁ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

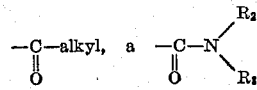

a —COOalkyl, a —SO₂alkyl and a

where R₂ and R₃ each represents a member selected from the group consisting of hydrogen and an alkyl group.

11. A cellulose acetate colored with a nuclear non-sulfonated azo dye compound having the general formula:

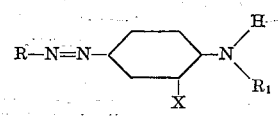

wherein R represents the residue of a member selected from the group consisting of a benzene and an azobenzene nucleus, $R_1$ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

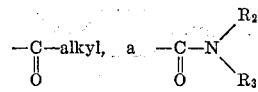

a —COOalkyl, a —SO$_2$alkyl and a

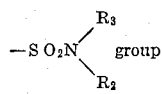

wherein $R_2$ and $R_3$ each represents a member selected from the group consisting of hydrogen and an alkyl group.

12. A cellulose acetate colored with a nuclear non-sulfonated azo dye compound having the general formula:

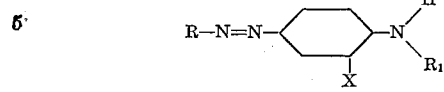

wherein R represents the residue of a benzene nucleus, $R_1$ represents a member selected from the group consisting of an alkyl group, a cycloalkyl group, a benzene nucleus, a furyl group and an unsaturated short chain aliphatic hydrocarbon group whose unsaturation consists of a double bond and X represents a member selected from the group consisting of a

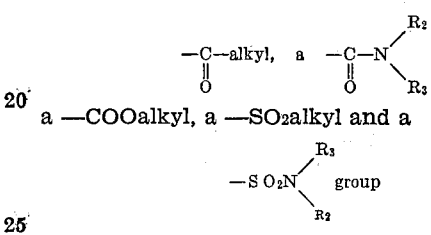

a —COOalkyl, a —SO$_2$alkyl and a wherein $R_2$ and $R_3$ each represents a member selected from the group consisting of hydrogen and an alkyl group.

JAMES G. McNALLY.
JOSEPH B. DICKEY.